US006980287B2

(12) United States Patent
Renard et al.

(10) Patent No.: US 6,980,287 B2
(45) Date of Patent: Dec. 27, 2005

(54) SYSTEM FOR TESTING AN OPTICAL NETWORK USING OPTICAL TIME-DOMAIN REFLECTOMETRY (OTDR)

(75) Inventors: Xavier Renard, Asnieres sur Seine (FR); Alexandre Touya, Paris (FR)

(73) Assignee: Nexans, Paris (FR)

( * ) Notice: Subject to any disclaimer, the term of this patent is extended or adjusted under 35 U.S.C. 154(b) by 168 days.

(21) Appl. No.: 10/650,484

(22) Filed: Aug. 27, 2003

(65) Prior Publication Data

US 2004/0196664 A1    Oct. 7, 2004

(30) Foreign Application Priority Data

Aug. 30, 2002  (FR) .................................... 02 10946

(51) Int. Cl.⁷ ............................................ G01N 21/00
(52) U.S. Cl. ..................................................... 356/73.1
(58) Field of Search ........................ 356/73.1; 385/24, 385/28, 37, 11; 398/9, 34, 173, 177

(56) References Cited

U.S. PATENT DOCUMENTS

| | | | |
|---|---|---|---|
| 5,187,362 A | 2/1993 | Keeble | ................. 250/227.15 |
| 5,510,917 A * | 4/1996 | Corke et al. | ................. 398/34 |
| 5,673,342 A | 9/1997 | Nelson et al. | ................. 385/24 |
| 6,009,220 A | 12/1999 | Chan et al. | ................. 385/24 |
| 6,028,661 A | 2/2000 | Minami et al. | ............. 356/73.1 |
| 6,363,184 B2 * | 3/2002 | Cao | ................. 385/24 |
| 6,583,899 B1 * | 6/2003 | Casanova et al. | ............. 398/9 |
| 6,587,235 B1 * | 7/2003 | Chaudhuri et al. | ........ 370/216 |

FOREIGN PATENT DOCUMENTS

| | | | |
|---|---|---|---|
| EP | 0855587 | 7/1998 | .......... G01M 11/00 |
| JP | 10062646 | 3/1998 | .......... G02B 6/293 |
| JP | 021445 | 1/2001 | .......... G01M 11/00 |
| WO | 8805233 | 7/1998 | ............ H04B 9/00 |
| WO | 9830881 | 7/1998 | .......... G01M 11/00 |

OTHER PUBLICATIONS

French Patent Office Search Report dated May 12, 2003 relating to FA 623999 and FR 0210946.

* cited by examiner

Primary Examiner—Tu T. Nguyen
(74) Attorney, Agent, or Firm—Sofer & Haroun, LLP

(57) ABSTRACT

The present invention concerns a system 10 using optical time-domain reflectometry (OTDR) to test a plurality of optic fiber lines 13 in a telecommunications network, more particularly suited to tree topology networks of PON type (Passive Optical Network). Said system comprises a plurality of fiber optic lines 13, a coupler 7 having one input and a plurality of outputs, each of said outputs being connected to one line of said plurality of lines 13, said system 10 being characterized in that it comprises means 14 for separating each of said lines 13 into two channels: a first channel 18 to receive a first test impulse corresponds to a first test and a second channel 19 to receive a second test impulse corresponding to a second test, the length of said second channel being greater than the length of said first channel by a predetermined overlength 15, each of said overlengths 15 being different for each of said lines 13.

15 Claims, 6 Drawing Sheets

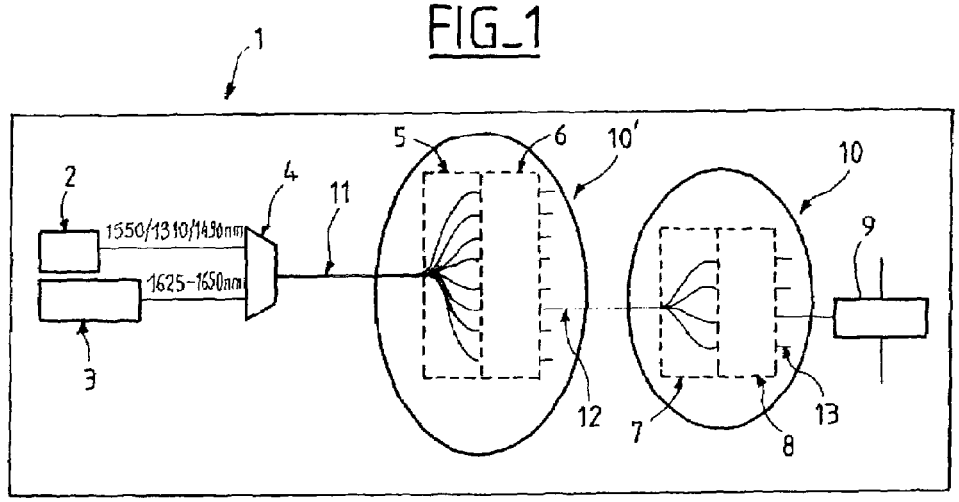
FIG_1
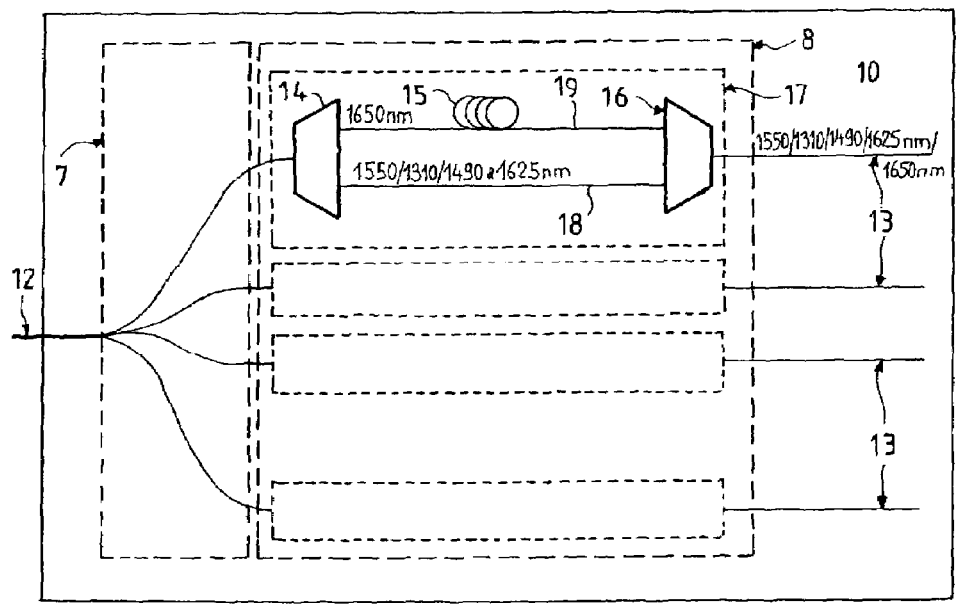
FIG_2

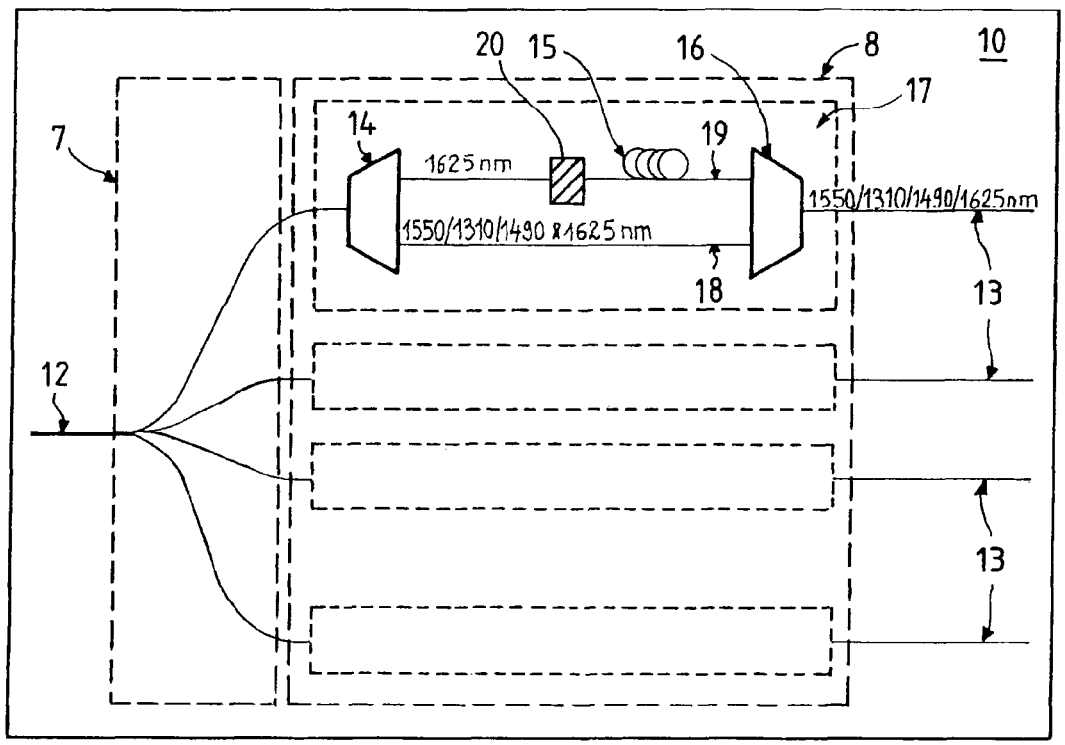
FIG_3
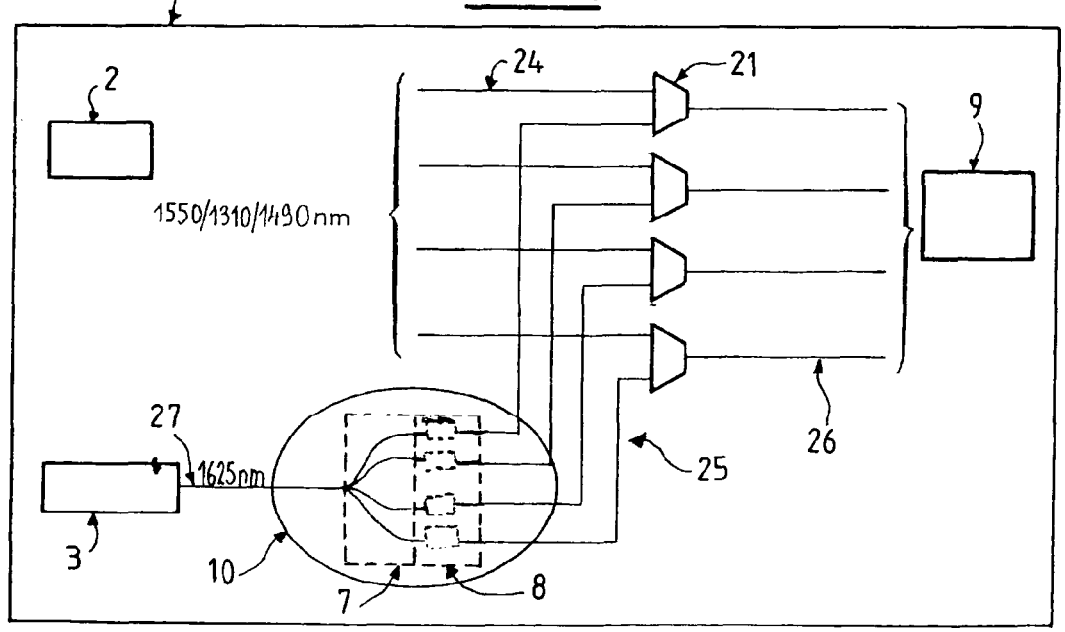
FIG_4

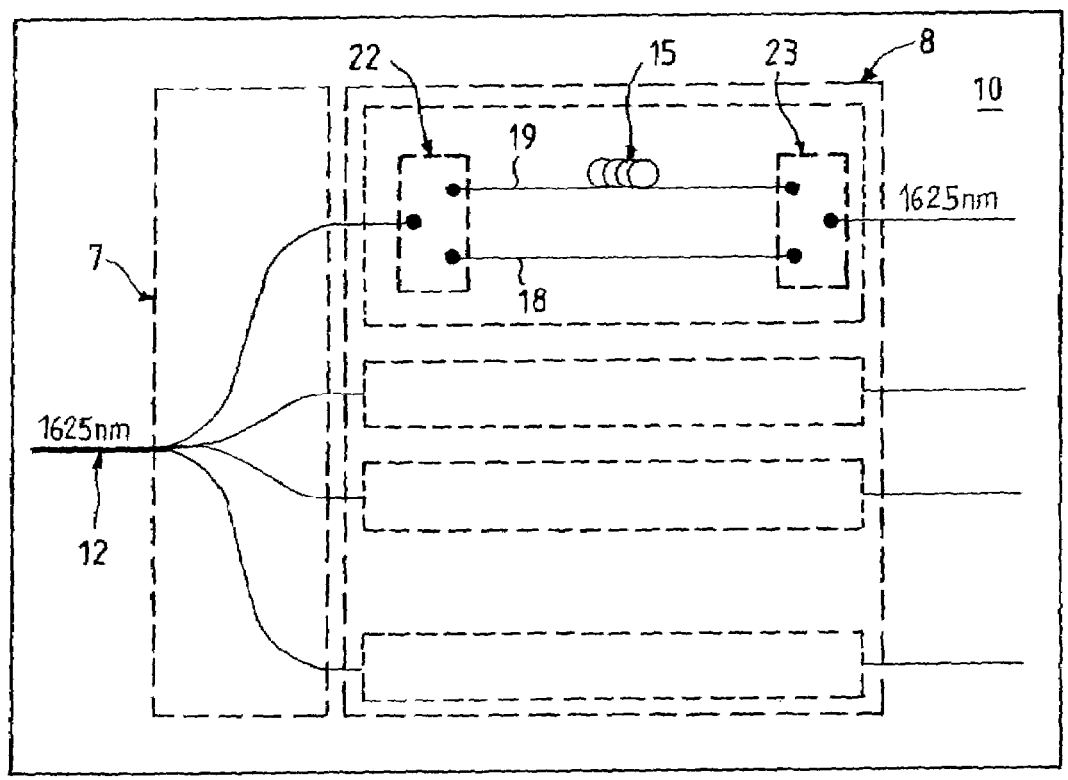

FIG_6
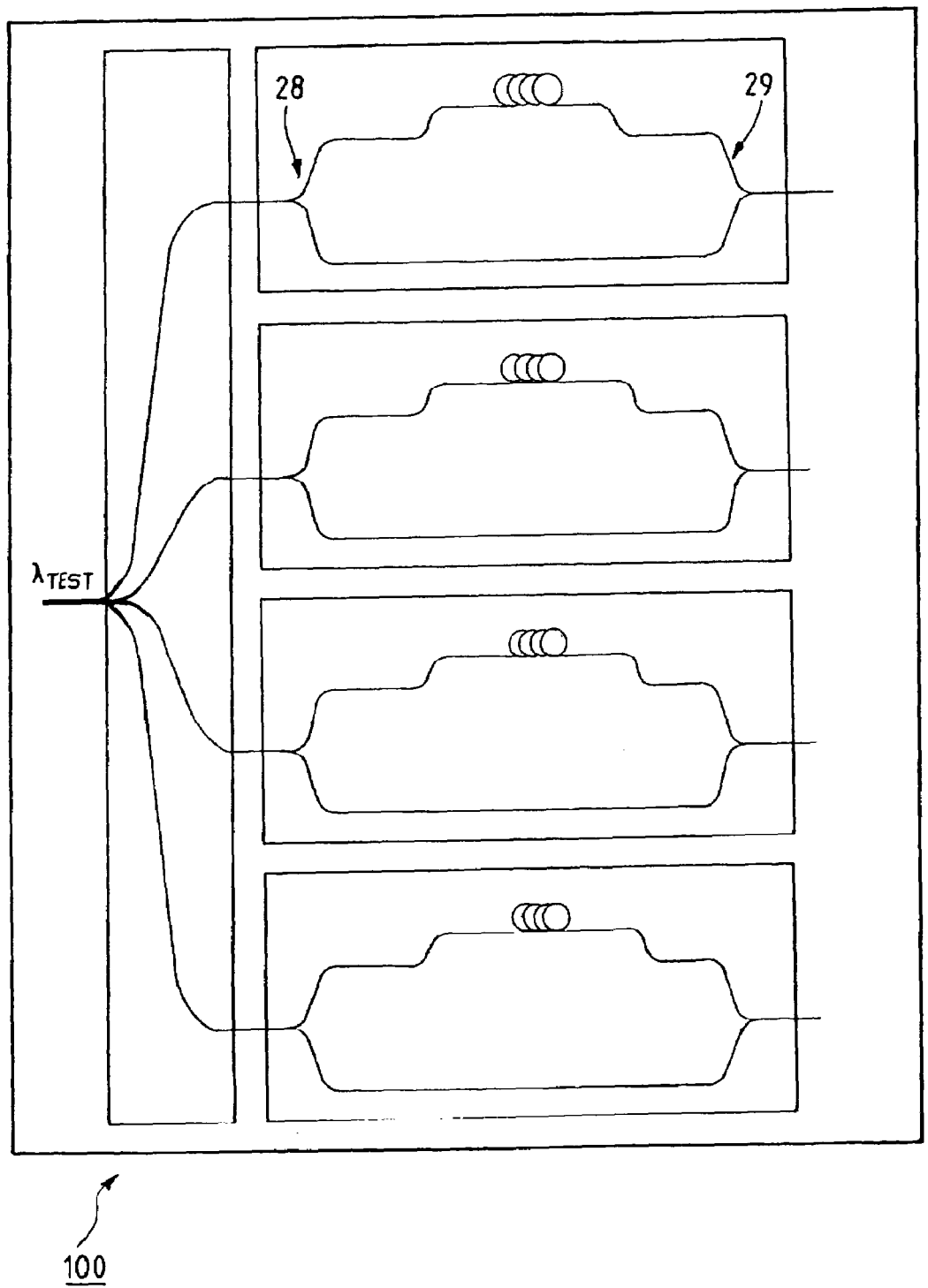

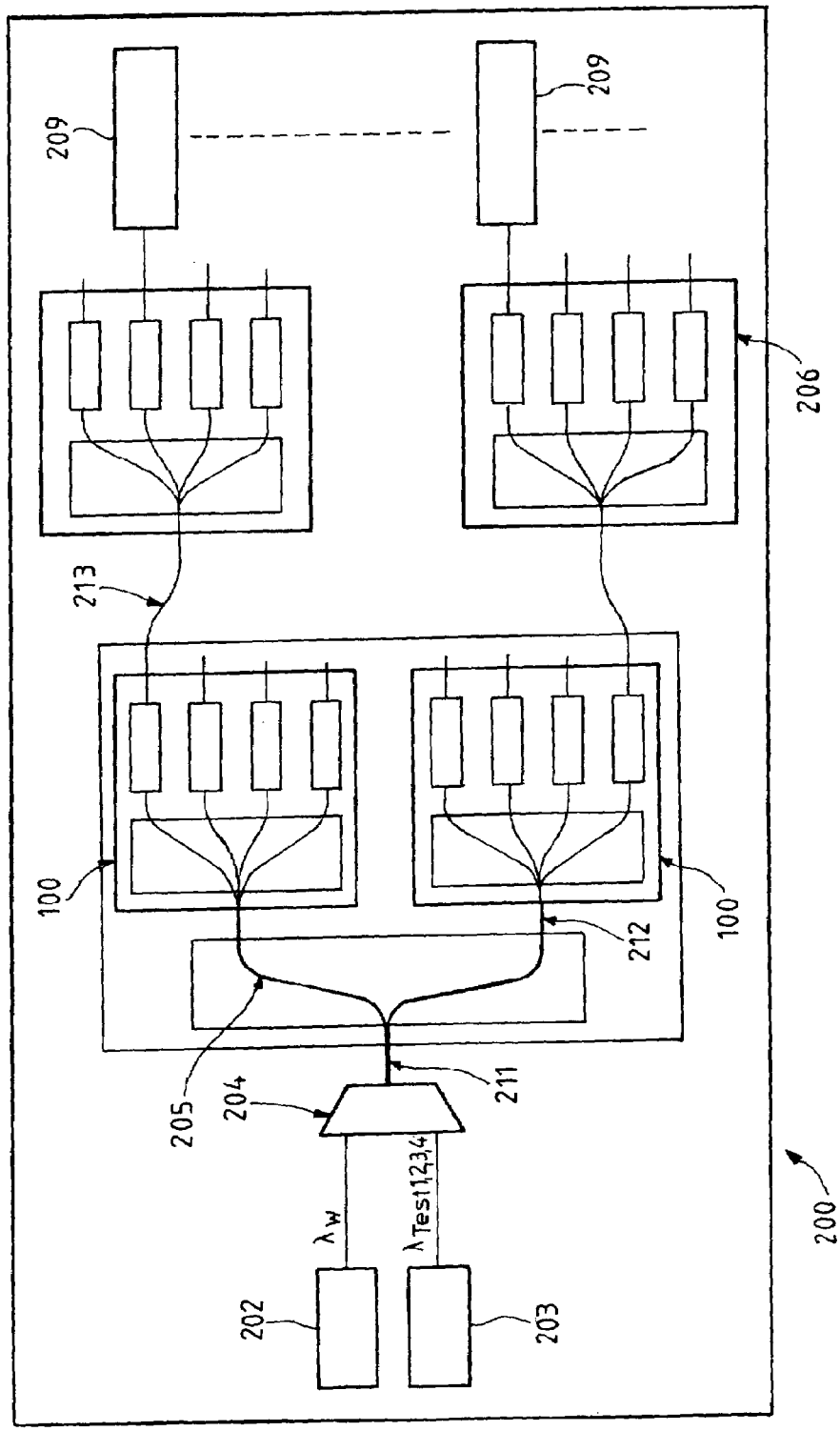
FIG_7

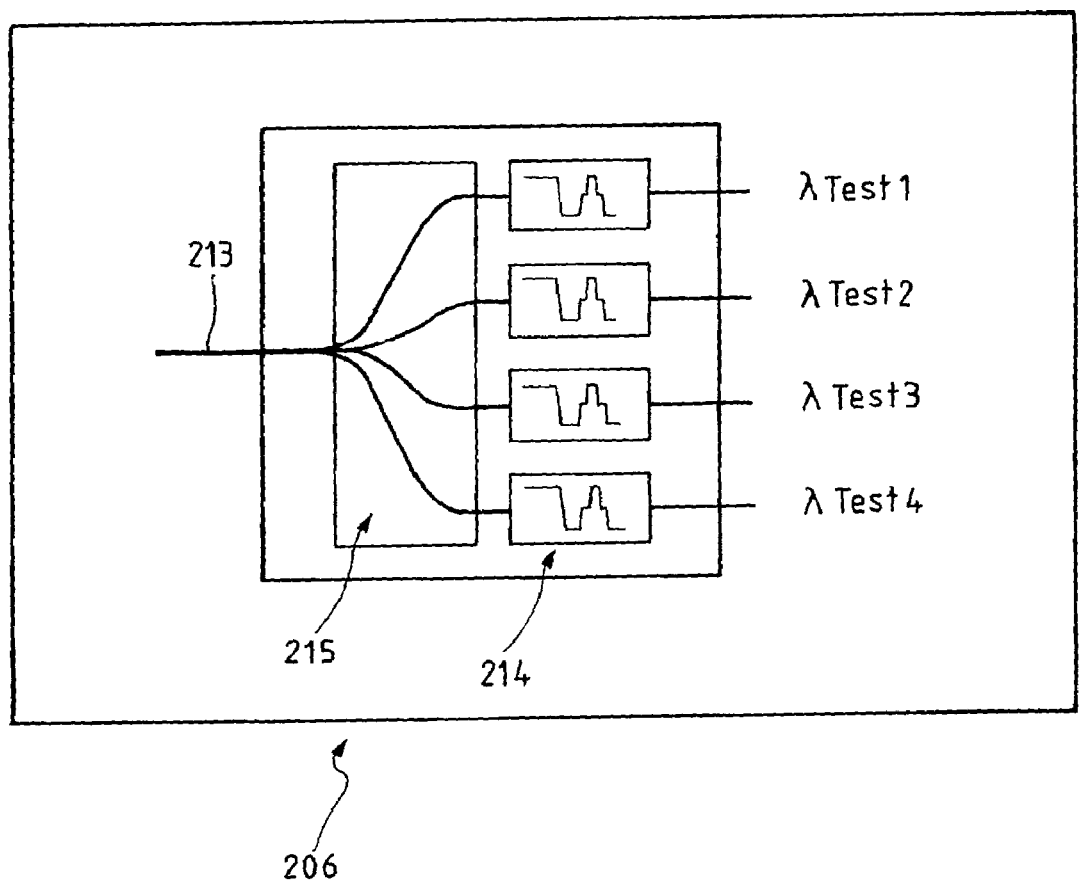
FIG_8

SYSTEM FOR TESTING AN OPTICAL NETWORK USING OPTICAL TIME-DOMAIN REFLECTOMETRY (OTDR)

RELATED APPLICATIONS

This application is related to and claims the benefit of priority from French Patent Application No. 02 10946, filed Aug. 30, 2002.

FIELD OF THE INVENTION

The present invention concerns a system using optical time-domain reflectometry (OTDR) to test a plurality of fibre optic lines in a telecommunications network, more particularly suited to tree topology networks of Passive Optical Network (PON) type.

BACKGROUND OF THE INVENTION

The flow rate of data transmitted by telecommunications networks is continually increasing. Therefore, increasingly more optic fires are used in these networks to meet these high speed requirements.

For every optic fibre installed, a verification of its characteristics must be made to ensure that they meet specifications and have no breaks or major attenuation.

The most frequently used devices to conduct these verification operations are devices called Optical Time-Domain Reflectometers (OTDRs). Optical reflectometry is also used by the operator to detect the position of a fault for faster, more efficient network repairs.

The principle of the OTDR technique is the detection and analysis, as a function of time, of the light backscattered by small imperfections and impurities present in the fibre (phenomenon known as Rayleigh back-scattering) and of the light reflected within the fibre (reflection on connectors, splices . . . ). The method consists of sending out a short impulse, from one end of the fibre, which propagates along the fibre and of measuring the quantity of light, as a function of time, which is backscattered towards a detector. On account of small imperfections and impurities in the fibre, part of the light is scattered in all directions. An ultrasensitive detector measures the quantity of backscattered light, i.e. which moves in the opposite direction to the direction of the incident impulse. With knowledge of the quantity of light that is at all times backscattered towards the detector, it is possible to determine the distribution of losses in the optic fibre. Therefore, a loss or fault at a determined point of the fibre will give rise to transitory discontinuity in the backscattered Optical Power tracing.

In tree topology networks, as in point-to-point networks, the OTDR system must be able to precisely locate faults occurring on the line. But this operation is made difficult on a tree-type network since all backscattered signals of all the lines are added together. Even if it is always easy to measure the distance between the fault and the OTDR, it is much more difficult to determine on which lines the faults have occurred.

One solution consists of placing a selective mirror at the end of the line of each subscriber, said mirror reflecting a predetermined wavelength, 1625 nm for example. Each subscriber is at a different distance from the detector of the OTDR system. The presence of the mirror leads to the presence of a reflective peak on the backscattered Optical Power tracing. The presence of a fault translates into transitory discontinuity in the monotonicity of the backscattered Optical Power tracing, indicating the distance between the OTDR and the fault. But with this indication alone, the fault may be located on any of the fibres of the tree network. It is the reflective peak which enables determination of the fibre on which the fault is located. Said reflective peak, highly attenuated or inexistent, indicates the presence of a fault on the line with which the mirror is associated. This line can be identified since each mirror is at a different distance from the OTDR.

However, the use of this kind of solution raises certain difficulties.

Firstly one must make sure that each mirror is at a different distance, otherwise the reflective peaks will be confused and it will no longer be possible to make a distinction between two branches. This is not an easy condition to meet, since it is difficult to know the exact length of the fibre on account of all the overlengths stored in the bays or boxes.

Also, when a fault occurs on two different lines, the faults are observed on the OTDR display. Two transitory discontinuities in the monotonicity of the Optical Power tracing are visible. These two faults will also lead to the presence of two attenuated peaks derived from the reflection of the two mirrors associated with each of the two faulty lines. The presence of the two peaks enables identification of the two faulty lines. However, it is difficult to allocate each of the two transitory discontinuities in the monotonicity of the tracing to the faulty line associated with it, and hence to determine the location of the fault on the faulty line. This difficulty in locating the fault in the event of several faulty lines is all the more critical since the losses on each of the two lines are substantially the same.

OBJECTS AND SUMMARY OF THE INVENTION

The present invention sets out to provide a system for determining and locating faults using an optical time-domain reflectometer (OTDR) in a network comprising a plurality of fibre optic lines, said system, in the event of a plurality of faults on a plurality of faulty lines, making it possible to determine the faulty lines and to locate the faults associated with each of the faulty lines even if the fibre length of the different lines is the same.

For this purpose the present invention puts forward a system for determining and locating faults using optical time-domain reflectometry in a network comprising a plurality of optic fibres to be tested, said system comprising a coupler having an input and a plurality of outputs, each of said outputs being connected to one line of said plurality of lines to be tested, said system being characterized in that it comprises means for separating each of said lines to be tested into two channels:
  a first channel to receive a first test impulse corresponds to a first test,
  a second channel to receive a second test impulse corresponding to a second test, the length of said second channel being greater than the length of said first channel by a predetermined overlength, each of said overlengths being different for each of said lines.

With the invention, a first impulse sent into the first channels of each line can detect whether there are any faults. The presence of a fault will give rise to transitory discontinuity in the monotonicity of the backscattered Optical Power tracing, this discontinuity being positioned at the location of the fault. In the event of a fault, a second impulse is sent into the second channel of each line. Each second channel has an overlength of optic fibre relative to the first channel. Also, this overlength is different on each line. Consequently, transitory discontinuity in the monotonicity of the backscattered Optical Power tracing, detected during the first measurement and associated with the fault, will move along the tracing during the second measurement of a length, equal to the overlength along which the light will have travelled. Therefore, measurement of the movement of the transitory discontinuity in the monotonicity of the tracing will give the value of the travelled overlength. As each line has a different overlength, it is very simple to associate a fault with a line irrespective of the fact that there may be several simultaneous faults on several lines.

Since the first measurement gives the distance between the OTDR and the fault, it becomes possible to geographically locate the fault and a technician can be sent to that location for its repair.

There are several ways of generating the first and second impulse.

One first solution consists of sending an impulse at a certain test wavelength which divides into two impulses, one first impulse entering the first channel and a second impulse entering the second channel. In this case the presence of a fault will give rise to a triple transitory discontinuity in the monotonicity of the backscattered Optical Power tracing, the first discontinuity being positioned at a point corresponding to the distance of the fault, the second being positioned at a point shifted by a length equal to the overlength travelled by the light, and the third discontinuity being positioned at a point shifted by a length equal to twice the overlength. With this solution, it is possible to detect the fault with one single test impulse divided into two impulses.

A second solution consists of using an impulse at one first wavelength which solely enters the first channel and a second impulse at a second wavelength, different from the first, which solely enters into the second channel. In this case, it is necessary to use a wavelength demultiplexer or adequate filters on each of the channels.

Finally, the system of the invention is a purely passive system.

Advantageously said overlength is an overlength of optic fibre.

According to one first embodiment, said means for separating each of said lines into two channels are a demultiplexer having at least two outputs.

Advantageously, each of said two channels are regrouped on said lines from which they are derived via a multiplexer having at least two inputs.

According to a second particular embodiment, one of said two outputs is connected to a saturable absorber device.

According to a third embodiment, said means for separating each of said lines into two channels are formed of a switch.

According to a fourth embodiment, said means for separating each of said lines into two channels are a coupler having at least two outputs.

Advantageously, each of said channels are regrouped on said lines from which they are derived by a coupler having at least two inputs.

A further subject of the invention is a method for determining and locating faults using an optical time-domain reflectometer (OTDR) in a network comprising a plurality of fibre optic lines using the system of the invention, characterized in that it comprises the following steps:

sending an impulse at a first wavelength into said first channel if a fault is detected, sending an impulse at a second wavelength into said second channel.

Advantageously, said first wavelength is different from said second wavelength.

A further subject of the invention is a method for determining and locating faults by optical time-domain reflectometry in a network comprising a plurality of optic fibre lines using a system according to the invention, characterized in that said method comprises the following steps:

sending a first impulse at a predetermined wavelength, the power of said first impulse being such that said saturable absorber device is in a blocked state, if a fault is detected, sending a second impulse at said predetermined wavelength, the power of said second impulse being such that said saturable absorber device is in a pass state.

The present invention also concerns a method for determining and locating faults by optical time-domain reflectometry in a network comprising a plurality of optic fibre lines using a system according to the invention, characterized in that said method comprises a step in which an impulse is sent at a predetermined wavelength, said impulse separating into a first impulse at said predetermined wavelength in said first channel and a second impulse at said predetermined wavelength in said second channel.

A further subject of the invention is an optical network characterized in that it comprises:

an optical time-domain reflectometer device for sending and analysing test impulses, a coupler having at least one input and at least two outlets, the input of said coupler being adapted to receive an impulse from said optical reflectometer device, at least two systems according to the invention, each of said two systems having its respective input connected to one output of said coupler, a plurality of couplers, called subscriber couplers, each of the outputs of said two systems being connected to an input of one of said subscriber couplers, and each output of said subscriber couplers being connected to a wavelength filtering device, the non-filtered wavelength being different for each output of one same subscriber coupler.

Advantageously, said coupler has one input and two outputs, each of said two systems according to the invention has one input and four outputs, and each of said subscriber couplers has one input and four outputs.

Finally, a further subject of the invention is a method for determining and locating faults in a network by optical time-domain reflectometry according to the invention, characterized in that it comprises the successive sending of four impulses and four different lengths, said four wavelengths respectively corresponding to the wavelengths that are not filtered by said wavelength filtering devices.

BRIEF DESCRIPTION OF THE DRAWINGS

Other characteristics and advantages of the present invention will become apparent in the following description of embodiments of the invention given for illustrative purposes and which are in no way restrictive.

In the following figures:

FIG. 1 is a diagram of the architecture of a tree topology network of PON type incorporating a system of the invention, FIG. 2 is a diagram of a system for determining and locating faults using an optical time-domain reflectometer (OTDR) system, according to a first embodiment of the invention, FIG. 3 is a diagram of a system for determining and locating faults using an optical time-domain reflectometer (OTDR) system, according to a second embodiment of the invention, FIG. 4 schematically shows the architecture of a point-to-point type network incorporating a system of the invention, FIG. 5 schematically shows a system for determining and locating faults using an optical time-domain reflectometer (OTDR) system, according to a third embodiment of the invention, FIG. 6 is a diagram of a system for determining and locating faults using an optical time-domain reflectometer (OTDR) system, according to a fourth embodiment of the invention, FIG. 7 schematically shows the architecture of a tree and branch network of PON type, incorporating a system according to a fourth embodiment of the invention, FIG. 8 shows a subscriber Final Drop Point (FDP) device such as used in the architecture of FIG. 7.

In all the figures, common items carry the same reference numbers.

DETAILED DESCRIPTION

FIG. 1 schematically shows the architecture of a tree network 1 of PON type (Passive Optical Network) comprising two systems 10 and 10' according to the invention.

Network 1 comprises:
a central office 2
an optical time-domain reflectometry system 3
a multiplexer/demultiplexer, 4
a first coupler 5,
first means 6 for length adaptation
a second coupler 7
second means 8 for length adaptation
subscriber terminals 9

Tree network 1 of PON type is a point-to-multipoint system enabling bi-directional data exchange between a central office 2 and subscriber terminals 9 via optic fibres 11 over a distance of the order of twenty kilometres. The wavelengths used for the optic signals during such exchange are generally 1310, 1490 and 1550 nm. Most often, data is transmitted from the central office 2 to the terminals 9 at 1550 nm via Time Division Multiplexing (TDM); data is transmitted from terminals 9 to the central office 2 at 1310 nm via Time Division Multiple Access (TDMA).

The optical time-domain reflectometry system 3 makes it possible to send test impulses at wavelengths of 1625 and 1650 nm.

On its two inputs, multiplexer/demultiplexer 4 receives data derived from central office 2 and impulses derived from the OTDR system. Output fibre 11 of the multiplexer/demultiplexer 4 is divided into eight optic fibre lines 12 by the first coupler 5; the eight lines 12 enter into the first length adaptation means 6.

Each of the eight lines 12 is then divided into four optic fibre lines 12 by the second coupler 7; the four lines 13 enter into the second length adaptation means 8 and are then connected to subscriber terminal 9.

System 10 according to the invention comprises the second coupler 7 and length adaptation means 8 and will be described more precisely with reference to FIGS. 2 and 3 which form two embodiments of the invention. System 10' of the invention comprises the first coupler 5 and length adaptation means 6 and is made in identical fashion to system 10.

FIG. 2 is a diagram of system 10 for determining and locating faults using an optical time-domain reflectometer (OTDR) system, according to a first embodiment of the invention.

System 10 of the invention comprises:
a coupler 7
length adaptation means 8

Length adaptation means 8 comprise four length adaptation modules 17.

Each of said modules 17 comprises:
a demultiplexer 14 having one input and two outputs
two optic channels 18 and 19, channel 19 having an optic fibre overlength 15,
a multiplexer 16 having two inputs and one output.

Optic fibre overlength 15 is different for each of modules 17: for example 10 m, 15 m, 20 m and 25 m of overlength can be taken for each of modules 17.

Each of the four outputs of coupler 7 is respectively connected to the input of demultiplexers 14 belonging to one of modules 17.

The two outputs of demultiplexer 14 are respectively connected to channel 18 and channel 19.

The two channels 18 and 19 are respectively connected to the two inputs of mutliplexer 16.

Channel 18 is used to transfer optic signals at 1625, 1550, 1490 and 1310 nm.

Channel 19 is used to transfer optic signals at 1650 nm.

Therefore, during formal data exchange operation, optic data circulates solely on channel 18 which allows wavelengths of 1550, 1490 and 1310 nm.

If a first test laser impulse is send at a wavelength of 1625 nm, this impulse is also sent into channel 18 as far as the subscriber.

If a fault is detected by the OTDR system such as shown in FIG. 1, a second laser impulse is sent at a wavelength of 1650 nm. This second impulse is guided into channel 19 via demultiplexer 14. Therefore the laser impulse at 1650 nm propagates along a length of fibre greater than the length on which the first impulse propagated at 1625 nm.

For example, a fault detected during the first measurement gives rise to transitory discontinuity in the monotonicity of the backscattered Optical Power tracing, this discontinuity being positioned at a length of 500 m. This first measurement indicates the position of the fault on the faulty line.

During the second measurement using a wavelength of 1650 nm, this discontinuity in monotonicity moves by a length of 15 m and is therefore positioned at 515 m. This length of 15 m corresponds to an overlength associated with a particular, fully identified line.

Therefore, each of overlengths 15 being different for each of modules 17, measurement of the movement of the discontinuity associated with the presence of a fault makes it possible to determine line 13 on which the fault is located.

FIG. 3 is a diagram of system 10 for determining and locating faults using an optical time-domain reflectometer (OTDR) system, according to a second embodiment of the invention.

System 10 is identical to the one shown in FIG. 2, with the difference that channel 19 is used to transfer optic signals at 1625 nm and comprises a saturable absorber device 20 in series which passes signals beyond a certain received signal power.

Therefore during normal data exchange operation, optic data circulates solely on channel 18 which allows wavelengths of 1550, 1490 and 1310 nm.

If a first test laser impulse of low power is sent at a wavelength of 1625 nm, this impulse is sent into channel 18 as far as the subscriber. This low power impulse is blocked on channel 19 by saturable absorber 20.

If a fault is detected by the OTDR system such as shown in FIG. 1, a second laser impulse of greater power is sent at a wavelength of 1625 nm. This second, stronger powered, impulse propagates partly along channel 19 so that saturable absorber 20 changes to a passing state, and partly on channel 18. Therefore the second laser impulse propagates along a length of fibre that is greater than the length on which the first impulse was propagated.

Consequently the discontinuity in the monotonicity of the backscattered Optical Power tracing associated with a fault detected during the first measurement moves during the second measurement by means of overlength 15.

Each of overlengths 15 being different for each of modules 17, by measuring the movement of the transitory discontinuity in monotonicity, it becomes possible to determine the line 13 on which the fault is located.

The embodiments just described concern the architecture of a point-to-multipoint network, but an architecture 1' can also be considered, as shown in FIG. 4, of a point-to-point architecture comprising a system 10 of the invention.

Network 1' comprises:
a central office 2,
an optical time-domain reflectometry system 3,
data lines 24,
an optic fibre 27,
test lines 25,
multiplexers 21,
a coupler 7,
length adaptation means 8,
subscriber lines 26,
subscriber terminals 9.

This type of network 1' allows data exchange between central office 2 and subscriber terminals 9, central office 2 having as many input nodes as there as subscriber terminals 9, each input node being connected to a terminal 9 via a data line 24 multiplexed by one of multiplexers 21 on whose output is a subscriber line 26. Data lines 24 operate at wavelengths of 1550, 1490 and 1310 nm.

Network 1' also allows testing of subscriber lines 26 via an optical time-domain reflectometry system 3 connected by optic fibre 27, operating at 1625 nm, to coupler 7. Fibre 27 is divided into four test lines 25 by coupler 7; the four test lines 25 enter into length adaptation means 8.

Each of the four lines 25 is then multiplexed on one of multiplexers 21.

System 10 of the invention will be described with more precision below with reference to FIG. 5.

FIG. 5 schematically shows a system 10 for determining and locating faults using an optical time-domain reflectometer (OTDR) system according to a third embodiment of the invention, adapted to a point-to-point network.

System 10 such as shown in FIG. 5 is identical to the one shown in FIG. 2 with the difference that it comprises a switch 22 switching an input on two outputs instead of a demultiplexer, and a switch 23 switching two inputs on an output instead of a multiplexer.

A first test laser impulse is first sent at a wavelength of 1625 nm into channel 18 as far as the subscriber by means of switches 22 and 23.

If a fault is detected by the OTDR system such as shown in FIG. 4, a second laser impulse is sent at the same wavelength of 1625 nm along channel 19 by switching the two switches 22 and 23. Therefore the second laser impulse propagates along a length of fibre greater than the length along which the first impulse was propagated.

Consequently the discontinuity in monotonicity of the backscattered Optical Power tracing associated with the fault detected during the first measurement will be moved during the second measurement by means of overlength 15.

Each of overlengths 15 being different for each of modules 17, measurement of the movement of the absorption peak makes it possible to determine the line 13 on which the fault is located.

FIG. 6 is a diagram of a system 100 for determining and locating faults using an optical time-domain reflectometer (OTDR) system, according to a fourth embodiment of the invention.

System 100 such as shown in FIG. 6 is identical to system 10 shown in FIG. 2 with the difference that each of the four length adaptation modules comprises a coupler 28 dividing an input on two outputs instead of a demultiplexer, and a coupler 29 regrouping two inputs on one output instead of a multiplexer.

Use of system 100 shown in FIG. 6 consists of sending an impulse at a certain test wavelength $\lambda_{TEST}$ which separates into two impulses reach representing approximately one half of the test impulse. There is therefore a first impulse which passes into the first channel at $\lambda_{TEST}$ and a second impulse entering the second channel at $\lambda_{TEST}$.

In this case, the presence of fault gives rise to a triple transitory discontinuity in the monotonicity of the backscattered Optical Power tracing. The first discontinuity is positioned at a point corresponding to the distance of the fault, the second is positioned at a point shifted by a length equal to the overlength travelled by the light and the third is positioned at a point shifted by a length equal to twice the overlength. With this type of solution it is therefore possible to detect the fault with a single test impulse separated into two impulses.

System 100 in FIG. 6 is advantageously used in a tree network of PON type such as shown in FIG. 7.

FIG. 7 is a diagram of the architecture of a tree network 200 of PON type (Passive Optical Network) comprising two systems 100 such as shown in FIG. 6.

Network 200 comprises:
a central office 202,
an optical time 6 domain reflectometer (OTDR) system,
a multiplexer/demultiplexer 204 with at least two inputs and at least one output,
a coupler 205 with at least one input and at least two outputs,
two systems 100 such as shown in FIG. 6 corresponding to primary subscriber connections of PFP type (Primary Flexibility Point)
eight final subscriber connection devices 206 of Final Drop Point (FDP) type with one input and four outputs which will be described more in detail with reference to FIG. 8
32 subscriber terminals 209

Tree network 200 of PON type is a point-to-multipoint system enabling bi-directional data exchange between the central office 202 and subscriber terminals 209 via optic fibres 211 over a distance in the order of twenty kilometres. Data is transmitted from the central office 202 to the terminals 209 at a wavelength $\lambda_W$ via Time Division Multiplexing (TDM); data is transmitted from terminals 209 to the central office 202 at another wavelength via Time Division Multiple Access (TDMA).

With the time-domain reflectometer system 203, it is possible to send test impulses at four test wavelengths $\lambda_{TEST1}$, $\lambda_{TEST2}$, $\lambda_{TEST3}$, $\lambda_{TEST4}$.

Multiplexer/demultiplexer 204, on its two inputs, receives data derived from central office 202 and the impulses derived from OTDR system 203. Outlet fibre 211 of multiplexer/demultiplexer 204 is divided into two optic fibre lines 212 by the first coupler 205; the two lines 212 enter into the two systems 100.

Each of the eight output lines 231 of systems 100 then enter into the eight devices 206 of final drop point type (FDP)

Each of the 32 outputs of the 8 FDP devices 206 is connected to a subscriber terminal 209.

FIG. 8 shows a device of Final Drop Point (FDP) type with one input and four outputs.

Device 206 comprises:

a subscriber coupler 215 with one input and four outputs so that input line 213 is separated into four lines 216, four filters 214 respectively allowing the passage of wavelengths $\lambda_{TEST1}$, $\lambda_{TEST2}$, $\lambda_{TEST3}$ and $\lambda_{TEST4}$.

Therefore, each line 216 only allows one test wavelength to pass.

Evidently, each filter also allows data transmission wavelengths $\lambda_W$ to pass.

Network 200 such as shown in FIG. 7 enables easy and efficient fault determination and location.

Four test impulses corresponding to the four test wavelengths $\lambda_{TEST1}$, $\lambda_{TEST2}$, $\lambda_{TEST3}$ and $\lambda_{TEST4}$ are sent in succession.

If a fault is located between the two systems 100 and FDP devices 206, each impulse is sufficient to determine and locate the fault and will give rise to triple discontinuity; the first discontinuity being positioned at a point corresponding to the distance of the fault, the second being positioned at a point shifted from the first by a distance equal to the overlength travelled by the light and the third being positioned at a point shifted by a length equal to twice the overlength.

If the fault is found between FDP devices 206 and subscribers 209, only one of the four test impulses will give rise to a triple discontinuity, the first discontinuity being positioned at a point corresponding to the distance of the fault, the second being positioned at a point shifted by a length equal to the overlength travelled by the light, and the third being positioned at a point shifted by a length equal to twice the overlength. Knowledge of this wavelength is sufficient to determine the subscriber line on which the fault is located.

Evidently the invention is not limited to the embodiments just described.

While remaining within the scope of the invention, it is possible in particular to modify the wavelengths used and the number of coupler inputs used.

Also, the second embodiment was described with a saturable absorber which may be replaced by any optical component having open or closed mode operation such as a bi-stable component.

In addition the coupler and length adaptation means may be made in one same integrated module, a semiconductor for example, on which the optic fibre overlengths are connected.

Finally the overlengths may or may not be integrated in the module and are not necessarily optic fibres.

What is claimed is:

1. A system for fault determination and location by time domain reflectometry in a network having a plurality of optic fibre lines to be tested, said system having a coupler with one input and a plurality of outputs, each of said outputs being connected to one line of said plurality of lines to be tested, said system comprising:

a means for separating each of said lines to be tested into two channels;

a first channel to receive a first test impulse corresponds to a first test; and a second channel to receive a second test impulse corresponding to a second test, the length of said second channel being greater than the length of said first channel by a predetermined overlength, each of said overlengths being different for each of said lines.

2. The system according to claim 1, wherein said overlength is an overlength of optic fibre.

3. The system according to claim 1, wherein said means for separating each of said lines into two channels is a demultiplexer having at least two outputs.

4. The system according to claim 3, wherein each of said two channels are regrouped on said line from which they are derived by a multiplexer having at least two inputs.

5. The system according to claim 3, wherein one of said two outputs of said demultiplexer is connected to a saturable absorber device.

6. The system according to claim 1, wherein said means for separating each of said lines into two channels is a switch.

7. The system according to claim 1, wherein said means for separating each of said lines into two channels is a coupler having at least two outputs.

8. The system according to claim 7, wherein each of said two channels are regrouped on said line from which they are derived by a coupler having at least two inputs.

9. A method for fault determination and location by optical time-domain reflectometry in a network having a plurality of optic fibre lines to be tested, wherein the system has a coupler with one input and a plurality of outputs, each of the outputs being connected to one line of the plurality of lines to be tested, said method comprising the steps of:

separating each of said lines to be tested into two channels;

sending a first impulse at a first wavelength into said first channel;

detecting a fault; and sending a second impulse at a second wavelength into said second channel corresponding to a second test, wherein the length of the second channel is greater than the length of said first channel by a predetermined overlength, and wherein each of said lines has different overlengths.

10. The method for fault determination and location according to claim 9, wherein said first and second test wavelengths are different.

11. The method as claimed in claim 9, further comprising the step of sending an impulse at a predetermined wavelength, said impulse dividing itself into a first impulse at said predetermined wavelength in said first channel and into a second impulse at said predetermined wavelength in said second channel.

12. The method as claimed in claim 9, wherein the step of separating each of said lines to be tested into two channels is performed using a demultiplexer with one of the two outputs of the demultiplexer being coupled to a saturable absorber device, said method further comprising the steps of:

sending a first impulse at a predetermined wavelength, the power of said first impulse being such that said saturable absorber device is in a blocked state; and if a fault is detected, sending a second impulse at said predetermined wavelength, the power of said second impulse being such that said saturable absorber device is in a passing state.

13. An optical network, said network comprising:

an optical time-domain reflectometer device for sending and analysing a test impulse;

a coupler having at least one input and at least two outputs, the input of said coupler being adapted to receive an impulse from said optical reflectometer device;

at least two systems, wherein each system has a means for separating each of said lines to be tested into two channels, a first channel to receive a first test impulse corresponds to a first test, and a second channel to receive a second test impulse corresponding to a second test, the length of said second channel being greater than the length of said first channel by a predetermined overlength, each of said overlengths being different for each of said lines, each of said two systems having its respective input connected to an output of said coupler; and a plurality of couplers, called subscriber couplers, each of the outputs of said two systems being connected to an input of one of said subscriber couplers and each output of said subscriber couplers being connected to a wavelength filtering device, the non-filtered wavelength being different for each output of one same subscriber coupler.

14. The optical network according to claim 13, wherein said coupler has one input and two outputs;

each of two fault detection systems has one input and four outputs, and each of said subscriber couplers has one input and four outputs.

15. A method for fault determination and location by time-domain refletometry in a network of claim 14, said method comprising the step of successive launching of four impulses at four different lengths, said four wavelengths respectively corresponding to wavelengths not filtered by said wavelength filtering devices.

* * * * *